United States Patent [19]
Klemt

[11] 3,737,854
[45] June 5, 1973

[54] METHOD OF CLASSIFYING CHARACTERS WHEREIN THE EFFECTS OF VARIATIONS IN CONTRAST BETWEEN A PRESENTED CHARACTER AND ITS BACKGROUND AND VARIATIONS IN BACKGROUND BRIGHTNESS ARE REDUCED, AND THE APPARATUS THEREFOR

[76] Inventor: Arthur Klemt, Schwalbeneck 5, 8031 Olching, Germany

[22] Filed: Sept. 8, 1971

[21] Appl. No.: 178,686

[52] U.S. Cl. .......................................340/146.3 AG
[51] Int. Cl. .......................................G06k 9/12
[58] Field of Search.......................................340/146.3

[56] References Cited

UNITED STATES PATENTS

| | | | |
|---|---|---|---|
| 3,560,927 | 2/1971 | Rabinow et al. | 340/146.3 MA |
| 3,496,541 | 2/1970 | Haxby et al. | 340/146.3 AG |
| 3,568,151 | 3/1971 | Majima | 340/146.3 AG |

*Primary Examiner*—Maynard R. Wilbur
*Assistant Examiner*—Leo H. Boudreau
*Attorney*—Louis E. Marn, James C. Jangarathis, James J. Burke II

[57] ABSTRACT

A method of reducing the effects upon character classification attributed to variations in the contrast between a presented character and its background and to variations in background brightness, and the apparatus therefor, are disclosed in accordance with the teachings of the present invention. A presented character is partitioned into a plurality of raster areas and a voltage representing the light intensity of each raster area is produced. A reference voltage proportional to the light intensity of a background area is also produced and difference voltages corresponding to the difference between the reference voltage and each raster area voltage are generated. The difference voltages together with the reference voltage are combined in resistor networks representing predetermined classes of characters to produce output voltages. Each output voltage is compared to a comparison voltage to determine which output voltages lie within certain predetermined limits. The presented character corresponds to the one predetermined class of characters represented by those resistor networks that produce such proper output voltages.

6 Claims, 3 Drawing Figures

Patented June 5, 1973 3,737,854

2 Sheets-Sheet 1

Inventor:
[signature]

METHOD OF CLASSIFYING CHARACTERS WHEREIN THE EFFECTS OF VARIATIONS IN CONTRAST BETWEEN A PRESENTED CHARACTER AND ITS BACKGROUND AND VARIATIONS IN BACKGROUND BRIGHTNESS ARE REDUCED, AND THE APPARATUS THEREFOR

This invention relates to character classification and more particularly, to a method of and apparatus for classifying a presented character wherein deleterious affects attributed to variations in contrast between the presented character and its background and to variations in background brightness are reduced.

In the character classification art wherein presented characters are automatically read and classified, it is necessary that the classification process be substantially independent of the contrast between the presented character and its background and, in addition, that background brightness have minimal influence on such process. For example, it is necessary that a character written for example with pencil on a blue background be recognized with the same certainty as a character written for example with black ink on a white background.

The prior art has developed two significant techniques for automatically reading and classifying characters, viz., contour-following techniques and raster field techniques. Contour-following techniques usually employ a cathode ray or light beam to follow the contours of a presented character whereby the horizontal and vertical deflections of the cathode ray or light beam are used for recognizing the character. Contour-following techniques are relatively insensitive to variations in contrast between the presented character and its background and to variations in background brightness, provided the presented character exhibits a certain minimal contrast level.

It has been found, however, that the contrast between a presented character and its background, as well as background brightness are significant factors that must be taken into account when raster field techniques are employed. A character that is to be classified by conventional raster field techniques is normally presented as a dark character on a bright background, and is illuminated by a light source. A darker character on a lighter background, or a weaker light reflecting character on a stronger light reflecting background, or a less opaque character on a more opaque background will hereinafter be denoted as "darkening on a bright background." Thus, a dark blue character on a light blue background may also be represented as "darkening on a bright background." Conventional raster field techniques, as developed by the prior art, partition a character which is presented in an image area into hypothetical raster areas. An array of photoelectrical devices, such as conventional photosensors, is disposed such that light emanating from the individual raster areas is projected into corresponding photoelectrical devices. The photoelectrical devices produce voltages in accordance with the light intensity impinging thereon and, therefore, the voltages generated by the array of photoelectrical devices are directly proportional to the brightness of the individual raster areas.

In a typical implementation of the raster field techniques, such as that disclosed in copending application Ser. No. 879,771, filed on Nov. 25, 1969 or in copending application Ser. No. 146,677, filed on May 25, 1971, one or more resistor networks are provided for each of the predetermined classes to which a presented character may belong. The values of the resistors included in the resistor networks are such that if the voltages produced by the array of photoelectrical devices are applied to said resistor networks, those resistor networks representing only one of said predetermined classes will produce output voltages that lie within certain predetermined limits. Consequently, it may be determined that the presented character corresponds to the one predetermined class associated with such proper output voltages. As disclosed in the aforementioned applications, the output voltage produced by each resistor network is compared in a comparison circuit to a comparison voltage that lies within said predetermined certain limits. A favorable comparison between the output voltage of one class and the comparison voltage results in a positive classification of the presented character.

An improvement in raster field classification that is independent of variations in contrast and background is ascertainable if the voltages produced by the array of photoelectrical devices are quantized to discrete digital voltage levels prior to the application thereof to the resistor networks. Accordingly, if the voltage produced by a photoelectrical device in response to the scanning of a raster area is below a certain threshold level, a magnitude of approximately zero volts is supplied to the resistor networks by that photoelectrical device. Conversely, if the voltage produced by a photoelectrical device in response to the scanning of a raster area exceed the threshold level, a voltage having a magnitude for example of one volt is supplied to the resistor networks. It is clear that even if the contrast and brightness vary, the fixed threshold is effective to distinguish between background, which produces a voltage above the threshold level, and darkenings of the presented character, which produce voltages below the threshold level. It has also been proposed to utilize a variable threshold level such that the quantizing of the voltages produced by the array of photoelectrical devices is dependent upon the particular features of the scanned document. Accordingly, one suggestion has contemplated the use of the average light intensity of a large portion of the document to derive the threshold level. Unfortunately, average light intensity does not accurately represent the actual contrast between a character and its background. Hence, different threshold levels are derived if the strokes forming the characters admit of different widths even though equal contrast is presented on the document. Another suggestion has been to set the threshold level as the mean value of the voltage generated in response to the scanning of the background and the voltage generated in response to the scanning of an area darkened by a presented character. The threshold level may be produced by employing two storage circuits admitting of suitable time constants. Although this latter suggestion is, in theory, meritorous, the circuits necessary to perform the requisite functions are extremely complex and expensive. Moreover, the application of quantized voltages to the resistor networks requires a very fine rastering of the image area and, therefore, necessitates a relatively large number of photoelectrical devices, quantizing circuits, resistor networks, etc., thereby demanding a highly complex and expensive implementation.

However if the voltages produced by the array of photoelectrical devices are not quantized prior to being applied to the resistor networks, it has been found that character classification may be achieved with a coarse rastering of the image area, although variations in contrast and background brightness have a significant deleterious effect upon such classification. Manually adjustable regulators may be utilized to minimize the effects attributed to variations in contrast and background brightness. However, success may be achieved by the use of such regulators only if the degree of darkening is substantially uniform among the different characters, if the light reflecting properties of the background are substantially constant and if the background is free of spots and blurs. It is recognized that these conditions are rarely satisfied, if at all. Such restrictions necessitate very stringent requirements with regard to the formation of characters and the quality of paper and, therefore, significantly minimize the utility of this raster field technique.

Of course, other procedures have heretofore been employed to achieve some measure of control over the effects attributed to the variations in contrast and background brightness. These procedures, as disclosed in the aforementioned applications, algebraically sum the voltages produced by the array of photoelectrical devices to form a summation voltage, which summation voltage is applied to each of the resistor networks to compensate the currents therein derived from the voltages produced by the photoelectrical devices. Unfortunately, only a limited amount of control over the effect attributed to variations in contrast and background brightness is obtainable thereby.

It has been observed that the portion of an image area that is darkened by a character normally comprises between 10 and 25 per cent of the total image area. Thus, for example, the numeral "1" darkens only about 10 per cent of the image area whereas the numeral "8" darkens about 25 per cent of the image area. Furthermore, the voltage generated by a photoelectrical device upon scanning a darkened raster area is smaller than the voltage generated by the photoelectrical device upon scanning a background area. Accordingly, if the voltages produced by the photoelectrical devices are summed to form a summation voltage, the portion of the summation voltage that is derived from the darkened areas is smaller than the portion of the image area that consists of darkened area. More particularly, only about 5 to 15 per cent of the summation voltage is derived from the darkened area. If the darkness of a character changes, for example, if the contrast between the character and its background is increased, then the light reflected from the darkened portions of the image area is correspondingly changed, whereas the dominant portion of the image area, i.e., the undarkened or background portion, remains unchanged. However, since the summation voltage is derived from the darkened and undarkened raster areas, it is observed that the small changes in the intensity of the light reflected from the darkened raster areas has but a small effect upon the total summation voltage. Thus, if the darkening of a character is intensified by a factor of 3, the summation of voltage decreases by approximately 10 per cent; and similarly, if the intensity of darkening decreases by a factor of 3, the summation voltage increases by approximately 10 per cent.

From the foregoing description of prior art contrast control techniques, it is appreciated that the use of a summation voltage has not been very effective and, in addition, requires the use of manually operable regulators to control the influence of background brightness. It must be emphasized that although the summation voltage is advantageously utilized by conventional techniques in recognizing characters, the effects of variations in background brightness must be eliminated in order to derive a unique relation between the summation voltage and the degree of darkening of an image area whereby the presented character may be recognized. Since the summation voltage drived from scanning white paper that is partly covered by characters is equal to the summation voltage derived from scanning somewhat darker but blank paper, the prior art has found it necessary to apply stringent requirements to the presentation of characters to be recognized, to the quality of paper utilized, to the light reflecting characteristics of an image area, and the like.

Therefore, it is an object of the present invention to provide a method of, and apparatus for, reducing the influence of variations in contrast between a presented character and its background and variations in background brightness.

It is another object of the present invention to provide a method of, and apparatus for, classifying a presented character wherein heretofore stringent requirements on the representation of said characters are not necessary.

A further object of the instant invention is to provide a relatively simple method and inexpensive apparatus for reducing the influence of variations in background brightness and variations in contrast between a presented character and its background on the classification of the presented character.

An additional object of the present invention is to provide a method of classifying a presented character, and the apparatus therefor, wherein voltages proportional to the degree of darkness of individual raster areas are derived and processed, and the effects of variations in contrast and background brightness are minimized.

Various other objects and advantages of the invention will become clear in the following detailed description of an exemplary embodiment thereof and the novel features will be particularly pointed out in connection with the appended claims.

In accordance with this invention, an improved method for reducing the influence of variations in contrast and background brightness on classifying a presented character, and the apparatus therefor, are provided wherein the presented character is scanned by an array of photosensor means wherein voltages are produced in accordance with the intensity of light emanating from the raster areas that form an image field; a reference voltage is produced by further photosensor means that scans undarkened areas, viz, background areas; a plurality of difference voltages proportional to the difference between the reference voltage and the respective raster area voltages are produced together with a summation voltage equal to the algebraic summation of said difference voltages; a plurality of resistor networks representing predetermined types of characters are supplied with the difference voltages and the summation voltage wherein said difference voltages and said summation voltage are processed to produce output voltages, each of which output voltages represents a relation between the characteristic features of the presented character and a corresponding one of the predetermined types of characters; and each of said output voltages is compared with a comparison voltage to determine which of said output voltages exhibit a minimum deviation from said comparison voltage, whereby said presented character corresponds to the one predetermined type of character associated with the minimally deviating output voltages.

Accordingly, the present invention classifies a presented character in accordance with voltages that are directly proportional to the degree of darkness of corresponding raster areas and, therefore, to the degree of darkness of the presented character, as opposed to prior art techniques wherein classification is a function of the degree of brightness of the presented character. Hence, a voltage to be processed exhibits a maximum value when its corresponding raster area is completely darkened and, conversely, exhibits a minimum value when a completely blank raster area is scanned. This is diametrically opposed to prior art raster field techniques.

The invention will be more clearly understood by reference to the following detailed description of an exemplary embodiment thereof in conjunction with the accompanying drawings in which.

Figure 1:
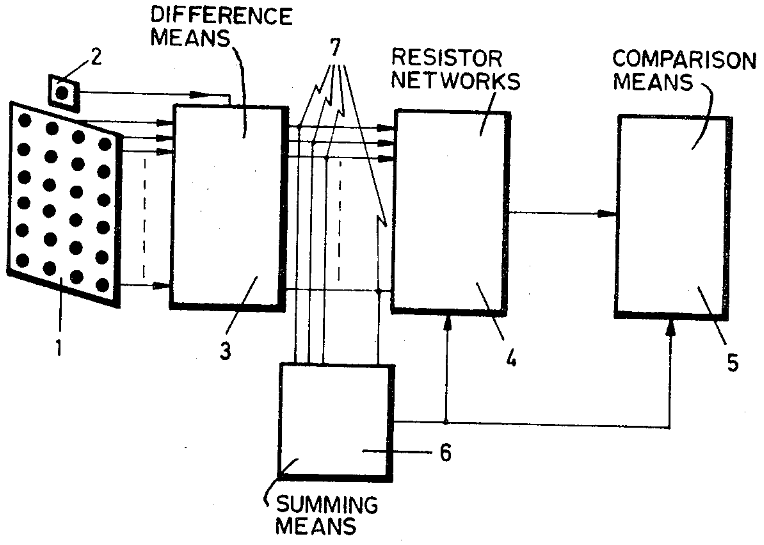
FIG. 1 is a block diagram of character classification apparatus in accordance with the present invention.

Referring now to the drawings, and in particular to FIG. 1, there is illustrated a block diagram of the present invention comprising an array of photosensor means 1, at least one additional photosensor means 2, difference means 3, a plurality of resistor networks 4, comparison means 5 and summing means 6. The precise structure of the illustrated blocks forms no part per se of the present invention and therefore, may be comprised of conventional components. However, the advantages obtained by the present invention will be readily understood from the following description of an exemplary embodiment thereof. The array of photosensor means 1 may comprise an array of conventional photoelectrical devices such as an array of photodiodes, phototransistors, phototubes or the like. The array of photosensor means 1 is adapted to scan an image area upon which the character to be classified is presented. Accordingly, the array of photosensor means 1 forms a raster field wherein each photosensor means generates a voltage proportional to the intensity of light emanating from a corresponding raster area that is scanned thereby, the sum of the raster areas forming the image area. The additional photosensor means 2 is adapted to generate a voltage proportional to the intensity of the background brightness of a scanned character and, therefore, is illustrated as being disposed without the image area defined by the array of photosensor means 1. It should of course be understood that the additional photosensor means 2 may be disposed within the image area at a unique position that remains undarkened, or blank, for all characters presented.

The individual photoelectrical devices comprising the array of photosensor means 1, as well as the additional photosensor means 2, are coupled to difference means 3. The difference means is adapted to produce a plurality of difference voltages each of which is proportional to the difference between a reference voltage generated by additional photosensor means 2 and a corresponding one of the voltages generated by a photoelectrical device. Accordingly, difference means 3 may be comprised of a plurality of differencing circuits equal in number to the number of photoelectrical devices comprising the array of photosensor means 1. If the voltages produced by the array of photosensor means 1 and the additional photosensor means 2 are AC voltages, then each differencing circuit included in difference means 3 may comprise a phase shift network capable of shifting the phase of the reference voltage 180 degrees and an adding circuit coupled to the phase shift network and to a corresponding one of the photoelectrical devices to algebraically add the voltage generated by the photoelectrical device and the reference voltage shifted in phase by 180 degrees. A typical adding circuit may comprise a pair of common connected summing resistors, an operational amplifier voltage adder, or the like. Alternatively, if the voltages generated by the array of photosensor means 1 and the reference voltage generated by the additional photosensor means 2 comprise DC voltages, then each differencing network included in difference means 3 may comprise polarity reversing means coupled to the additional photosensor means 2 to reverse the polarity of the reference voltage and an adding circuit coupled to the polarity reversing means and to a corresponding one of the photoelectrical devices to algebraically add the voltage generated by the photoelectrical device and the polarity reversed reference voltage. An exemplary polarity reversing means may comprise a conventional inverting amplifier, and a typical adding circuit may be similar to the aforedescribed examples. A further embodiment of each of the differencing circuits comprising difference means 3 may be a conventional differential amplifier capable of producing a difference voltage proportional to the difference between the input voltages supplied thereto. Hence, each differential amplifier may include a first input terminal coupled to the additional photosensor means 2 and a second input terminal coupled to a corresponding one of the photoelectrical devices comprising the array of photosensor means 1.

The output terminals 7 of difference means 3 are therefore provided with difference voltages that are directly proportional to the degree of darkening of corresponding raster areas scanned by the array of photosensor means 1. The difference voltages are capable of obtaining a value intermediate a maximum value corresponding to a completely darkened raster area and a minimum value, such as zero, corresponding to a completely undarkened, or blank raster area. The output terminals 7 are coupled to resistor networks 4 and to summing means 6. Summing means 6 may comprise a conventional algebraic adding circuit adapted to produce a summation voltage equal to the algebraic sum of all of the difference voltages. Hence, summing means 6 may comprise a plurality of common connected resistance means each of which includes a first terminal connected in common and a second terminal connected to a corresponding one of output terminals 7. Alternatively, the summing means 6 may comprise a conventional operational amplifier adding circuit. The output terminal of summing means 6 is connected in common to resistor networks 4 and to comparison means 5.

The resistor networks 4 are comprised of a plurality of resistor circuits each of which is adapted to be supplied with a plurality of difference voltages. The resistor networks 4 may correspond to those described in the aforementioned Patent applications and, therefore, may include a plurality of groups of resistor circuits each of which groups represent a predetermined type of character. Alternatively, a predetermined type of character may be represented by only one resistor circuit. The values of the resistors forming each individual resistor circuit represent the characteristic features of a unique one of the predetermined types of characters. The unique features describe the shape and darkened raster areas that characterize that predetermined type of character. Accordingly, each resistor circuit forms a bridge circuit wherein individual raster area difference voltages are applied to the resistors comprising one arm of the bridge circuit and the summation voltage is applied to the other arm of the bridge circuit. Hence, each bridge circuit produces an output voltage that manifests the degree of correlation between the presented character and the character represented by the bridge circuit. The presented character may be classified as the one predetermined type of character represented by the bridge circuit whose output voltage lies within predetermined values. A more detailed explanation of the resistor circuits that may comprise the resistor networks 4 is here deferred and will be provided below with reference to FIG. 2.

The output terminal of each resistor circuit comprising the resistor networks 4 is coupled to comparison means 5. The comparison means serves to determine which of the output voltages lie within predetermined limits. Accordingly, each output voltage is compared to a comparison voltage and the difference therebetween is determined. It should be appreciated that the presented character is classified in accordance with those output voltages that minimally deviate from the comparison voltage. It has been found by the present inventor that if the comparison voltage is a function of the contrast and background brightness of the presented character then variations in contrast and background brightness will not introduce a deleterious effect upon the results obtained by comparison means 5. Accordingly, the comparison voltage corresponds to the summation voltage generated by summing means 6. Comparison means 5 may comprise conventional differential amplifying circuits or may correspond to the comparison means described by the aforementioned Patent applications. An exemplary embodiment of comparison means 5 is set forth hereinbelow with reference to FIG. 3.

In operation, it is recognized that the difference voltage produced by difference means 3 in response to an undarkened, or blank, scanned raster area is approximately equal to zero notwithstanding the unique features of the scanned background. Thus, the output voltages produced by resistor networks 4 and compared in comparison means 5 are not subject to the influences of brightness or color of the scanned background. Hence, the manual compensating procedures heretofore required by the prior art are herein eliminated. Furthermore, it is readily appreciated that the difference voltages applied to the resistor networks 4 are directly proportional to the degree of darkness of the scanned raster areas and, therefore, to the degree of darkness of the presented character. Consequently, if the contrast of a presented character against its background varies by a certain constant factor, then the difference voltages derived from darkened raster areas as well as the summation voltage vary by the same constant factor. Accordingly, the voltages applied to each arm of the bridge circuits comprising the resistor networks vary by the same constant factor. Hence, those output voltages produced by resistor networks 4 that lie within predetermined levels are not affected by the variation in contrast. In those bridge circuits wherein the output voltages do not lie within the predetermined levels, said output voltages will vary at most by said constant factor. Those of ordinary skill in the prior art will appreciate that this is an improvement over the prior art wherein the output voltages heretofore produced by similar resistor networks have varied by a multiple of the contrast variation factor since the voltages generated in response to darkened raster areas changed by the same factor as the contrast whereas the summation voltage changed by only a small amount, for example, 10 per cent of the variation in contrast. Accordingly, if the contrast between a presented character and its background varies by a factor 2, the input voltages produced by the resistor networks in accordance with the present invention also change by a factor of ; however, the output voltages produced by resistor networks in accordance with prior art techniques vary by an additional order of magnitude. Hence, the instant invention is capable of reliably classifying presented characters which may be hand printed or machine printed and which may be subject to variations in printing pressure, variable stroke width, typewriter ribbon characteristics and the like.

As has been described hereinabove, it is preferred to apply a comparison voltage to comparison means 5 that is equal to the summation voltage produced by summing means 6. In this preferred embodiment it is recognized that the comparison voltage may vary by the same factor as the output voltages produced by resistor networks 4 if the contrast or background brightness of the presented character varies. Consequently, the presented character may be classified in accordance with the illustrated apparatus independent of the variations in contrast and background brightness of the character.

Although FIG. 1 illustrates that the additional photosensor means 2 is comprised of a single photoelectrical device, it has been found that a reference voltage which is an even more reliable representation of the background light intensity may be produced by providing a plurality of photoelectrical devices in the additional photosensor means 2. Each of the photoelectrical devices produces a voltage derived from a scanned undarkened raster area and the thus produced voltages may be averaged to produce the reference voltage. Accordingly, each of the photoelectrical devices comprising the additional photosensor means 2 may be coupled to an averaging network such as a conventional operational amplifier averager circuit, and the output of the averaging network may then be coupled to difference means 3.

It should be apparent that the light emanating from the presented character and impinging upon the array of photosensor means 1 may be reflected light. Accordingly, light may be transmitted from a conventional source of light to the presented character whereat the transmitted light is modulated in accordance with the shape and darkening of said presented character. The modulated light is then reflected to the array of photosensor means 1. Alternatively, the presented character may be carried by an opaque film such that the character appears as a darkened shape on said film. In this case, the presented character may be interposed in a light path extending from a conventional source of light to the array of photosensor means 1 such that the light transmitted by the source of light passes through the opaque film and is modulated in accordance with the shape of the presented character. It is further apparent that, if desired, a plurality of conventional amplifying means may be utilized to couple the voltages produced by the array of photosensor means 1 and the reference voltage produced by the additional photosensor means 2 to the difference means 3.

Figure 2:
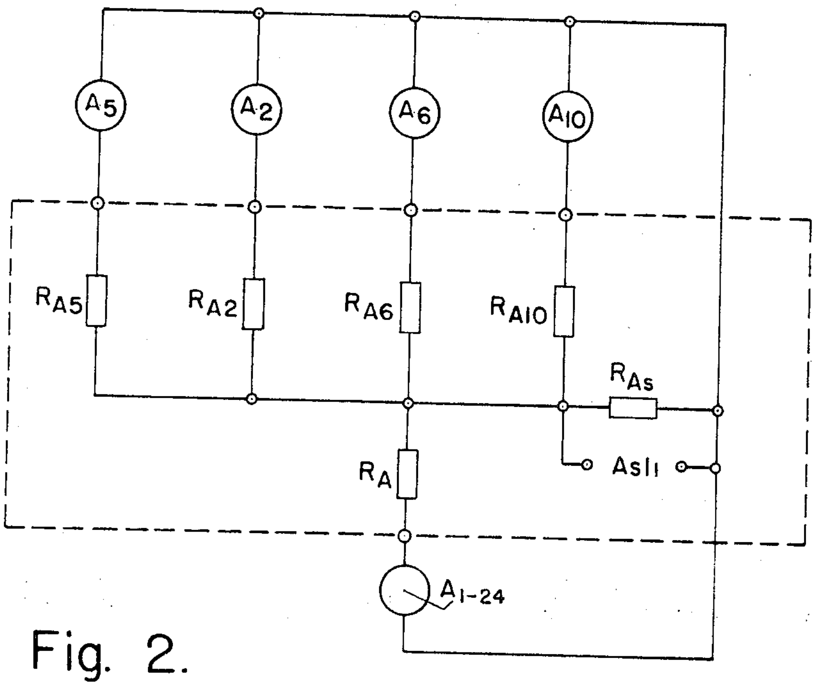
FIG. 2 is a schematic diagram of a typical construction of one of the resistor networks included in block 4 of FIG. 1.

As has been described hereinabove, as disclosed in the aforementioned co-pending Applications, resistor networks 4 are comprised of a plurality of resistor circuits representative of the characteristic features of predetermined types of characters. Each predetermined type of character may be represented by one resistor circuit or by a group of resistor circuits. The structure of one such typical resistor circuit is schematically illustrated in FIG. 2 wherein reference characters $A_5$, $A_2$, $A_6$, and $A_{10}$ denote the difference voltages that are derived from corresponding ones of the photoelectrical devices comprising the array of photosensor means 1. Resistors $R_{A5}$, $R_{A2}$, $R_{A6}$, and $R_{A10}$ are supplied with the aforementioned difference voltages and are connected to a common junction to form one arm of a bridge circuit. The reference numeral $A_{1-24}$ denotes the summation voltage generated by summing means 6 and is applied to resistor $R_A$ which form the other arm of the bridge circuit. It should be readily apparent that if the presented character corresponds to the predetermined character represented by the illustrated resistor circuit, then the summation of the voltages $A_5+A_2+A_6+A_{10}$ produced at the common junction of resistors $R_{A5}$, $R_{A2}$, $R_{A6}$, and $R_{A10}$ is equal to the summation voltage $A_{1-24}$ applied to resistor $R_A$. Accordingly, the output voltage $A_s\ 1_1$ produced across resistor $R_{As}$ is substantially equal to zero. It should be particularly understood that the values of the resistors illustrated in FIG. 2 and the selection of the difference voltages supplied thereto are uniquely determined for each of the resistor circuits comprising the resistor networks 4 of FIG. 1. Consequently, if each predetermined type of character is represented by one resistor circuit then the output voltage of one and only one resistor circuit will be substantially equal to zero upon the scanning of a presented character. The presented character may thus be classified as that character associated with the resistor circuit from which the output voltage is substantially equal to zero. Alternatively, if each predetermined type of character is represented by a group of resistor circuits, each of which resistor circuits corresponds to the schematic diagram of FIG. 2, then the output voltage produced by each of the resistor circuits included in one group will deviate from zero by a specified minimum amount. Consequently, the presented character may be classified in accordance with the one group of resistor circuits that produce output voltages having such minimal deviation.

Figure 3:
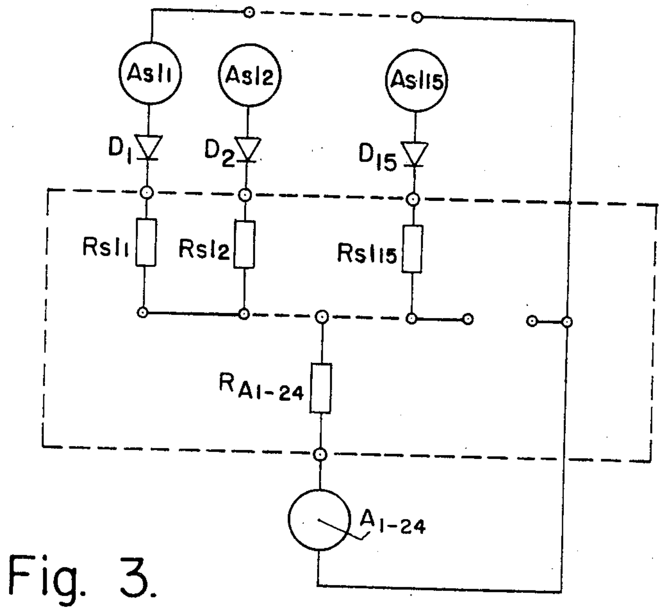
FIG. 3 is a schematic diagram of a typical construction of the comparison means denoted as block 5 in FIG. 1.

A schematic illustration of one comparison circuit that may comprise comparison means 5 is illustrated in FIG. 3 wherein reference numeral $A_s1_1$, $A_s1_2$ and $A_s1_{15}$ denote the voltages produced by each resistor circuit included in one group of resistor circuits that represent one predetermined type of character. The voltages are coupled to resistors $R_s1_1$, $R_s1_2$ and $R_s1_{15}$ by diodes $D_1$, $D_2$ and $D_{15}$, respectively. These resistors form one arm of a bridge circuit. The reference numeral $A_{1-24}$ denotes the summation voltage produced by summing means 6 and applied to comparison means 5 of FIG. 1. The summation voltage is applied to resistor $R_{A\ 1-24}$ which comprises the other arm of the bridge circuit. It is observed that a summation of the output voltages generated by one group of resistor circuits is compared to a comparison voltage which in this case, is equal to the summation voltage. If each of the output voltages $A_s1_1$, $A_21_2$, and $A_21_{15}$ deviate from zero by a predetermined minimum amount then the voltage A will obtain a desired magnitude to thereby indicate the classification of the presented character. It is readily apparent that comparison means 5 includes a plurality of comparison circuits such as that schematically illustrated in FIG. 3, and corresponding in number to the number of predetermined types of characters. Hence, the voltage A will be produced by one and only one of the comparison circuits in response to a presented character. If each predetermined type of character is represented by only a single resistor circuit such as that illustrated in FIG. 2, and not by a group of resistor circuits, then the comparison circuit illustrated in FIG. 3 will be supplied with only a single output voltage. In this case, the comparison circuit will be comprised only of diode $D_1$, resistor $R_s1_1$ and resistor $R_{A\ 1-24}$. Accordingly, diodes $D_2$ and $D_{15}$ as well as resistors $R_51_2$ and $R_21_{15}$ may be omitted. Nevertheless, the operation of the comparison circuit is identical to that just described.

While the invention has been particularly shown and described with reference to an exemplary embodiment thereof, it will be obvious to those skilled in the art that various changes and modifications in form and details may be made without departing from the spirit and scope of the invention. For example, the resistor networks 4 and comparison means 5 may be constructed of conventional devices that perform functions analogous to that previously described with reference to FIGS. 2 and 3. Hence, the resistor networks and comparison means need not conform in every detail to the schematic illustrations of FIGS. 2 and 3. It is therefore intended that the appended claims be interperted as including all such changes and modifications.

What is claimed is:

1. In a character classifying process wherein a presented character is partitioned into a plurality of raster areas, voltages representative of the light intensity of said raster areas are combined in resistor networks representing predetermined classes of characters to produce output voltages and each of said voltages is compared to a comparison voltage to determine which of said predetermined classes said presented character corresponds, an improved method for reducing the influence of variations in contrast between the presented character and its background and variations in background brightness on the character classifying process, comprising the steps of:

generating a reference voltage representing the light intensity of a discrete background area that is not provided with any portion of said presented character;

producing a plurality of difference voltages, each of said difference voltages being proportional to the difference between said reference voltage and a voltage representative of the light intensity of a corresponding raster area, whereby a difference voltage obtains a minimal value if a corresponding raster area is not provided with any portion of said presented character and a difference voltage obtains a maximal value if a corresponding raster area is completely provided with a portion of said presented character;

algebraically summing said plurality of difference voltages to produce a summation voltage;

combining said plurality of difference voltages and said summation voltage in said resistor networks; and comparing each of the voltages produced by said resistor networks in response to said combining to a threshold level.

2. The improved method of claim 1 wherein said threshold level is equal to said summation voltage.

3. The improved method of claim 2 wherein said step of generating a reference voltage comprises the steps of:

scanning a plurality of those background areas not provided with any portion of said presented character to produce a corresponding plurality of background voltages; and averaging the produced background voltages to generate said reference voltage.

4. Apparatus for classifying a presented character as being one of a plurality of predetermined types wherein said presented character is imaged onto a raster field having a plurality of raster areas, comprising:

an array of photosensor means forming said raster field for producing voltages in accordance with the intensity of light projected thereon by said presented character;

a further photosensor means for producing a reference voltage in accordance with the intensity of light projected thereon by the background of said presented character;

difference means coupled to said array of photosensor means and said further photosensor means for producing a plurality of difference voltages, each of said difference voltages being proportional to the difference between said reference voltage and a voltage produced by a corresponding one of said array of photosensor means;

summing means coupled to said difference means for algebraically summing said difference voltages to produce a summation voltage;

resistor networks representing said predetermined types coupled to said difference means and said summing means for combining difference voltages and said summation voltage to produce output voltages, each of said output voltages representing a relation between said presented character and a corresponding one of said predetermined types; and comparison means coupled to said resistor networks for comparing each of said output voltages with a comparison voltage for determining which of said output voltages represents a predetermined relation.

5. The apparatus of claim 4 wherein said comparison means is additionally coupled to said summing means whereby said comparison voltage is equal to said summation voltage.

6. The apparatus of claim 5 wherein said further photosensor means comprises a plurality of photosensor means for scanning only background areas of said presented character; and means for producing a reference voltage having a value equal to the average value of the voltages produced by said plurality of photosensor means.

* * * * *